UNITED STATES PATENT OFFICE.

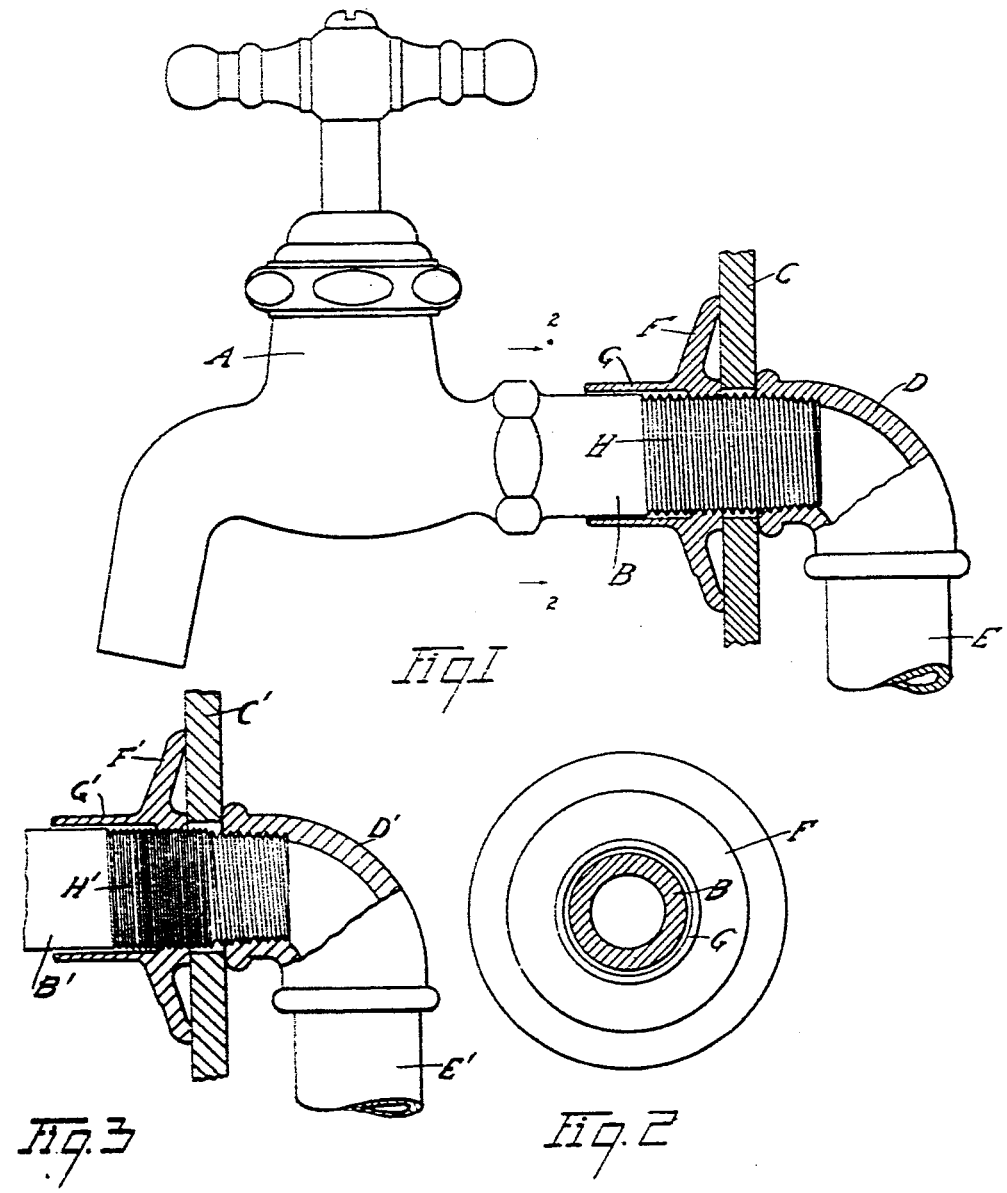

JOSEPH REGAR, OF CLEVELAND, OHIO, ASSIGNOR TO THE REGAR COMPANY, OF CLEVELAND, OHIO, A CORPORATION OF OHIO.

FAUCET ATTACHMENT.

1,078,379.  Specification of Letters Patent.  Patented Nov. 11, 1913.

Application filed June 24, 1910. Serial No. 568,647.  REISSUED

*To all whom it may concern:*

Be it known that I, JOSEPH REGAR, a citizen of the United States, residing at Cleveland, in the county of Cuyahoga and State of Ohio, have invented a certain new and useful Improvement in Faucet Attachments, of which the following is a full, clear, and exact description, reference being had to the accompanying drawings.

This invention relates to water-cocks or faucets of the type generally used with sinks or wherever such a device is needed, and it has for its object the production of a device of that type that will present a neat appearance, that will have all the threads thereon concealed and protected, that will be capable of ready application and that will be securely held in position when once applied. These objects are attained in the construction shown in the drawings, in which,—

Figure 1 is a side view, partly in section and partly in elevation, of my invention, showing the same applied to a back or dash-board, the latter also being shown in section; Fig. 2 is a section taken on the line 2—2 of Fig. 1, looking in the direction of the arrows thereon; and Fig. 3 is a view showing in section parts of a cock of modified construction.

First taking up a description, by the use of reference characters, of the form shown in Figs. 1 and 2, A represents a water-cock having a shank B, the same being adapted to project through the back or dash-board C which is customarily used on sinks and like places, or through the wall of a bath-tub or similar device, and D is the elbow or other pipe connection joining the shank of the cock with the pipe E. The rear end of the shank B is preferably tapered, so as to fit the elbow D, it being customary to taper the threaded interior of such connections. The threads on said tapered portion are, however, continued at the same pitch forwardly over the untapered part of the shank for some distance, said threads extending inside of the back or dash-board C when the parts are assembled.

Surrounding the shank B, and threaded thereon, is a flange F, the same being adapted to contact with the forward face of the back C and thus clamp the latter between the elbow and flange. The flange F is provided with a forwardly extending sleeve G, which is not threaded and which surrounds, protects and conceals the threads H on the shank. As stated, the said threads H are continued forwardly from the tapered portion of the shank; and this threaded and untapered portion of the shank is substantially equal in length to the combined length of the flange with the sleeve attached thereto. That is to say, the distance from the front edge of the sleeve to the rear edge of the flange is substantially equal to the length of the threaded portion of the shank in front of the tapered portion, so that, no matter how thin the back or dash-board C may be made, the sleeve G will project over and beyond the threads on the shank.

In applying the cock, the flange F is screwed onto the shank so as to leave the rear end of the latter projecting, which end is then inserted through the back and screwed into the elbow D. The flange F is then screwed rearwardly until it clamps the back between itself and the front edge of the elbow or other connection at the rear, in which position the sleeve G projects forwardly beyond the threaded portion of the shank and thus protects the threads and also conceals the same, so that the entire structure presents an attractive appearance. I find it desirable in applying the cock to stop screwing the shank into the elbow when the cock stands at almost ninety (90) degrees from its final position and to then screw the flange back against the back. When in this position, a final turn of the cock to its proper angle results in tightly clamping the back between the flange and elbow.

In the form shown in Fig. 3, C', D', E', F', and G' represent respectively the back or support for the water-cock, the elbow or other pipe connection, the water-pipe, the flange and the sleeve on said flange.

B' represents the shank of the cock, the rear end of which is tapered and threaded to fit the threaded portion of the elbow. Instead, however, of extending the threads continuously forward over the untapered portion, the shank in front of the taper is somewhat enlarged in diameter, which enlarged portion is threaded at H' to receive the flange F'. The pitch of the threads H' may or may not be the same as that of the threads on the tapered end of the shank, the drawing showing these threads of shorter or finer pitch. The threads H' will, of course, correspond in pitch with those in the flange F'.

It will be seen that in both the forms of threading shown, the flange is passed over the taper thread on to the parallel thread, either rotating in such passage or moving without such rotation. The unthreaded portion B of the shank of the cock extends for a distance at least as great as that of the sleeve G or G', so that the sleeve may entirely overlie the unthreaded portion of the shank, or its extreme edge just overlap it, as desired, giving an adjustment substantially equal to the length of the sleeve. This provides for attaching the cock into all sorts of supports—bath tubs, sink backs, wooden boards, etc.

Having thus described my invention, what I claim is:—

1. The combination, in a faucet cock or bib, of a shank having a tapered male thread at the end portion of the shank and a straight male thread on an intermediate portion and a collar having a straight threaded opening adapted to coact with the straight threads on the shank, the straight threads on the shank extending for a considerably greater distance than the threads on the collar, whereby the collar may stand on the straight thread of the shank in advance of the rear end of such thread, and a cylindrical flange on the forward side of the collar adapted to extend over the threads on the shank in front of the engaging portion of the collar, irrespective of the position of the collar on such threads.

2. The combination, with a faucet, bib or cock having a shank provided near the end with a tapered male thread and on an intermediate portion with a straight male thread of a number of turns, a collar screw threaded on the straight thread and adapted to stand with its rear face in front of the beginning of the straight thread; and having a forwardly projecting cylindrical flange adapted to surround and hide the straight threads in front of the threaded engagement of the collar, irrespective of the position of the collar on the straight thread, the tapered thread being adapted to occupy and firmly seat in a standard female fitting at the rear of a lavatory back or wall, the collar being adapted to simultaneously abut the front face of such back or wall.

3. The combination, with a faucet, cock or bib having a shank provided with external threads, the threads adjacent to the end of the shank being tapered and the threads on the intermediate portion of the shank being straight, a collar screw threaded on the straight thread and having a forwardly extending flange adapted to hide the straight threads in front of the engagement of the collar, said straight threads at the rear of the collar engagement being adapted to occupy an opening in a lavatory back or wall when the collar engages the front of such back or wall and the tapered thread occupies a standard female fitting abutting the rear of such back or wall.

4. The combination of a faucet, cock or bib having a shank provided with a tapered male thread adjacent to its end, a straight male thread on an intermediate portion of the shank, and a collar having a threaded engagement with the straight thread and adapted to occupy an intermediate position thereon, said collar being provided with a forwardly extending cylindrical flange adapted to overhang and cover the straight threads in front of the threaded engagement of the collar and overhang also an unthreaded portion of the shank, said straight threads at the rear of the collar being adapted to extend into a lavatory back or wall of substantial thickness, which is clamped between the collar, and a standard female member pipe fitting embracing the tapered threads and abutting the rear face of such back or wall.

In testimony whereof, I hereunto affix my signature in the presence of two witnesses.

JOSEPH REGAR.

Witnesses:
 ALBERT H. BATES,
 BRENNAN B. WEST.